United States Patent Office 3,418,415
Patented Dec. 24, 1968

3,418,415
ESTROGENIC STEROIDAL COMPOSITIONS COMPRISING 1-HYDROXY-ESTRADIOL AND DERIVATIVES THEREOF
Klaus Prezewowsky and Friedmund Neumann, Berlin, and Rudolf Wiechert, Berlin-Wannsee, Germany, assignors to A. G. Schering, Berlin, and Bergkamen, Germany
No Drawing. Filed May 10, 1966, Ser. No. 548,830
Claims priority, application Germany, May 19, 1965,
Sch 37,082
24 Claims. (Cl. 424—238)

ABSTRACT OF THE DISCLOSURE

Compounds of the formula:

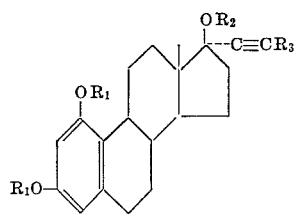

have been found to have strong estrogenic and ovulation-preventing effects in oral and parenteral application if $R_1$ and $R_2$ are hydrogen, lower alkyl, tetrahydropyranyl, or acyl radicals of a physiologically tolerated carboxylic acid, and $R_3$ is hydrogen, chlorine, lower alkyl, or lower alkynyl. Various methods of preparing the compounds are being described.

---

The invention relates to 1-hydroxy-estradiol derivatives of the formula

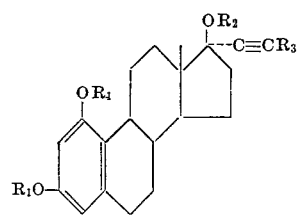

wherein $R_1$ and $R_2$ are members of the group consisting of hydrogen, lower alkyl, tetrahydropyranyl, and the acyl radical of a physiologically tolerated carboxylic acid; $R_3$ is a member of the group consisting of hydrogen, chlorine, lower alkyl and lower alkynyl. In preparing the compounds of the invention, the keto group in position 17 of 1-hydroxyestrone, with or without prior etherification of the 1,3-dihydroxy groups, is converted to the 17β-hydroxy-17α-alkynyl group by means of $R_3C\equiv CMgBr$ or a corresponding alkali metal alkynylide, whereupon the free or etherified hydroxyl groups are hydrolyzed, esterified, or etherified depending on the desired nature of $R_1$ and $R_2$.

Physiologically tolerated carboxylic acids whose acyl radicals may constitute $R_1$ and $R_2$ include acetic acid, propionic acid, hydroxypropionic acid, β-chloropropionic acid, cyclopentylpropionic acid, caproic acid, heptanoic acid, benzoic acid, mono- and dichloracetic acid, succinic acid, and the like.

In view of the pharmaceutical application of the products, the ether radicals are preferably methyl, ethyl, and tetrahydropyranyl radicals.

The novel compounds are prepared by methods known in themselves.

The 17-ketone is reacted in a suitable solvent with an alkyne, a chloroalkyne, or a dialkyne and an alkali metal, preferably in the presence of a tertiary alcohol or in the presence of ammonia, and under elevated pressure if needed. Chloroalkynes and dialkynes are preferably formed during the reaction from halogenated alkenes or halogenated alkynes with alkali metal. Alkynyl magnesium halide may be used instead of alkali metal alkynylide.

Suitable solvents include ethers, such as diethyl ether, tetrahydrofuran, and dioxane, or hydrocarbons such as benzene or toluene. Suitable tertiary alcohols include tert-butyl and tert-amyl alcohol.

The 1-hydroxyestrone not being a very stable compound, it may be preferable to start from a compound in which the hydroxyl groups in positions 1 and 3 are etherified. If the ether radicals are to be introduced only as temporary protective radicals, it is preferred to etherify with dihydropyran, because these ether radicals are readily removed after alkynylation of the 17-position, as is well known.

The free or liberated hydroxyl groups may then be modified by partial or total esterification and/or etherification, by partial removal of initially introduced groups or by transesterification.

Pyridine and acid anhydrides are preferably employed at room temperature for selective acylation in positions 1 and 3.

Diazomethane and dialkyl sulfate are the preferred alkylating agents for etherification in positions 1 and 3.

If the 17β-hydroxyl group of the 1,3-diesters or 1,3-diethers so obtained is to be esterified, the steroid may be reacted with acid anhydrides in the presence of strong acids, such as p-toluenesulfonic acid, or pyridine/acid anhydride at elevated temperature. The last-mentioned methods may also be employed for converting the free trihydroxy-compounds directly into the triacylates. The 1- and 3-hydroxyl groups of the triacylates may be liberated by careful partial saponification.

1,3-diesters and 1,3-diethers may be converted into the corresponding 17-tetrahydropyranyl ethers by means of dihydropyran in the presence of a strong acid such as p-toluenesulfonic acid. If it is desired to etherify the 17-OH group in the 1,3-diethers of the invention with an alkyl radical, alkyl halides in liquid ammonia are preferably employed. The two last-mentioned methods also make it possible to etherify all three OH groups of the trihydroxy compound in a single operation.

The 1- and the 3-hydroxyl groups of the 1,3-diacyl-17-tetrahydropyranyl derivatives can be liberated by alkaline saponification.

If it is desired to produce 1,3,17β-trihydroxy compounds whose 17-OH group is alkylated or acylated, it is particularly advantageous to etherify the 1-hydroxyestrone with dihydropyran, to introduce the desired alkyl or acyl radical after alkynylation into the 17β-OH group, and finally to split the tetrahydropyranyl group selectively from positions 1,3. The 1,3-dihydroxy compounds may thereafter be etherified or esterified in the desired manner.

The compounds produced by the method of the invention have valuable therapeutic properties. They show surprisingly strong estrogenic and ovulation-preventing effects. The compounds may be applied orally, intramuscularly or subcutaneously. The often superior effects of the compounds of the invention are shown in the following table of ovulation prevention tests and Allen-Doisy tests in which 1-hydroxy-17α-ethynyl-estradiol (I), the corresponding di-acetate (II), and 1-hydroxy-17α-butadiynylestradiol-1,3-diacetate (III) were compared with known estrogens IV and V.

TABLE

| Compound | Estrogenic effect, threshold value in Allen-Doisy Test, oral (gamma) | Ovulation preventing effect, median effective dose, oral (gamma) |
| --- | --- | --- |
| 1-hydroxy-17α-ethynyl-estradiol (I) | 3 | 10 |
| 1-Hydroxy-17α-ethinyl-estradiol-1,3-diacetate (II) | 1 | 10-30 |
| 1-Hydroxy-17α-butadiynyl-estradiol-1,3-diacetate (III) | | 10-30 |
| 17α-Ethynyl-estradiol (IV) | 10 | 100 |
| 17α-Ethynyl-estradiol-3-methylether (V) | 100 | 100 |

The novel estratriol derivatives of the invention are incorporated for therapeutic use in the medicinal compositions usual in galenic pharmacy which include the usual addition agents, carriers, and taste correcting ingredients, by means of conventional methods. They may be applied orally in the form of tablets, dragees, capsules, pills, suspensions, or solutions, and may be applied parenterally, particularly in oily solutions, for example in sesame oil or castor oil solutions which may contain a diluent such as benzyl benzoate or benzyl alcohol. The concentration of the active agents of the invention in the medicinal compositions depends on the form of application. Tablets may contain about 20 γ, and oily solutions for intramuscular injection may contain about 50 γ per milliliter.

The medicinal agents of the invention are useful in ailments which respond to treatment with estrogen, or with estrogen in combination with compounds having gestagenous effects. Examples of ailments susceptible of treatment include the climacteric and its sequelae, disturbances of peripheral blood circulation and amenorrhea. When combined with nor-ethisterone acetate, the compounds of the invention also are suitable for putting the ovary at rest.

The following examples illustrate the method of preparing the compounds of the invention.

Example 1

(a) A Grignard solution was prepared from 30 g. of magnesium chips and 91.4 ml. of ethyl bromide in 400 ml. of tetrahydrofuran, and was converted to the acetylene magnesium bromide compound by charging the solution with acetylene gas for 1 to 2 hours. A solution of 7 g. of 1-hydroxyestrone in 150 ml. of tetrahydrofuran was added dropwise to the suspension, and the mixture was agitated for 20 hours at 70° C. under argon. The reaction mixture was cooled and decomposed with saturated aqueous ammonium chloride solution, the organic phase was separated, and the aqueous phase was extracted repeatedly with ether. The combined organic phases were washed with saturated sodium chloride solution and dried over desiccated sodium sulfate. The residue obtained after evaporation of the solvent was chromatographed over silica gel, and 1-hydroxy-17α-ethynylestradiol was eluted with a mixture of benzene and ethyl acetate 97:3. The raw product was dissolved in ethyl acetate, filtered over carbon, and recrystallized from ethyl acetate/hexane.

There were obtained 2 g. of 1-hydroxy-17α-ethynyl-estradiol having a melting point of 189/190–191° C.

UV: $\epsilon_{207}=38,400$, $\epsilon_{286}=2,160$.

(b) 2 g. of 1-hydroxy-17α-ethynylestradiol were dissolved with cooling in 5 ml. pyridine and 5 ml. acetic anhydride. The reaction mixture was left to stand for 15 hours at room temperature, and was then poured into a tenfold amount of ice water. The precipitate formed was filtered off with suction, washed with water, dried, and recrystallized from isopropyl ether and methylene chloride. There were obtained 2 g. of 1-hydroxy-17α-ethynylestradiol-1,3-diacetate of M.P. 197/198–199° C.

UV: $\epsilon_{207}=18,900$, $\epsilon_{266}=412$.

(c) 2.5 g. of 1-hydroxy-17α-ethynylestradiol-1,3-diacetate were dissolved in 30 ml. acetic anhydride, and were gradually mixed with cooling and agitation with 1.9 g. of p-toluenesulfonic acid in 18 ml. acetic anhydride. A precipitate was formed with ice water after a reaction period of five hours, and the triacetate precipitated was filtered off after one hour's agitation, washed until neutral, and dried. There were obtained 2.6 g. of 1-hydroxy-17α-ethynylestradiol-triacetate.

(d) A mixture of 3 g. of 1-hydroxy-17α-ethynyl-1,3-diacetate with 15 ml. of pyridine and 10 ml. acetic anhydride was heated for ten hours on an oil bath having a temperature of 150° C. under nitrogen. The reaction mixture was cooled to room temperature and then added to ice water. After one hour's stirring, the precipitate was filtered off, washed with water, and dried. 2.8 g. 1-hydroxy-17α-ethynyl-estradiol-triacetate were obtained.

UV: $\epsilon_{207}=18,500$, $\epsilon_{266}=410$.

Example 2

3 g. 1-hydroxy-17α-ethynylestradiol were acetylated as described in Example 1(c) or 1(d) to the 1-hydroxy-17α-ethynyl-estradiol-triacetate.

UV: $\epsilon_{207}=18,500$, $\epsilon_{266}=410$.

Example 3

(a) A solution of diazomethane in ether was added to a solution of 2 g. of 1-hydroxy-17-ethynylestradiol in 150 ml. of ether until the yellow color of diazomethane persisted. The solvent was then evaporated in a vacuum, and the 1,3-dimethylether of 1-hydroxy-17α-ethynylestradiol was obtained as a residue.

(b) 1 g. of 1-hydroxy-17α-ethynylestradiol was dissolved in 100 ml. of aqueous potassium hydroxide containing 2 mol equivalents of KOH, and 2 mol equivalents of dimethyl sulfate were added with cooling. The precipitated dimethyl ether was extracted with ether after an hour, the organic phase was washed with water and dried. The solvent was evaporated, and 1-hydroxy-17α-ethynyl-estradiol-1,3-dimethyl ether was obtained.

UV: $\epsilon_{205}=38,200$, $\epsilon_{284}=2,060$.

(c) 1 g. of 1 - hydroxy - 17α - ethynylestradiol-1,3-dimethyl ether was esterified according to Example 1(c) or 1(d) to the 1-hydroxy-17α-ethynylestradiol-1,3-dimethyl ether-17β-acetate.

UV: $\epsilon_{205}=38,100$, $\epsilon_{284}=2,050$.

Example 4

A trace of ferric nitrate was added at −80° to −60° C. to about 100 ml. of liquid ammonia, and thereafter 0.134 g. of sodium in small pieces. After the blue color had disappeared, 1.8 g. of 1-hydroxy-17α-ethynyl-estradiol-1,3-dimethyl ether in 50 ml. of tetrahydrofuran were added dropwise within 10 minutes, and the mixture was agitated for 1 to 2 hours. Thereafter, 1 g. of methyl iodide in 10 ml. of tetrahydrofuran was added, and stirring was continued for three hours. The mixture was then poured over ice, neutralized with acetic acid, and extracted with methylene chloride. The organic phase was washed with water and dried over sodium sulfate. When the solvent was evaporated, 1-hydroxy-17α-ethynylestradiol-1,3,17β-trimethyl ether was obtained as a residue.

UV: $\epsilon_{205}=38,300$, $\epsilon_{285}=2,040$.

Example 5

550 mg. of 1-hydroxy-17α-ethynylestradiol were converted by the method of Example 4 to 1-hydroxy-17α-ethynylestradiol-trimethyl ether by means of 0.134 g. sodium and 1 g. methyl iodide.

UV: $\epsilon_{205}=38,300$, $\epsilon_{285}=2,040$.

Example 6

2 g. of 1-hydroxy - 17α - ethynylestradiol - 1,3,17β - triacetate were suspended in 100 ml. of methanol. A solution of 1 g. of potassium carbonate in 10 ml. of distilled water was added to the suspension with stirring at room temperature. The reaction mixture was made weakly acid after 1.5 hours, and added to ice water with agitation. The precipitate formed was filtered with suction after some time, and washed with water until neutral, then 1.2 g. of 1-hydroxy-17-ethynylestradiol-17β-acetate were obtained.

UV: $\epsilon_{206}=38,500$, $\epsilon_{287}=2,150$.

Example 7

5.7 g. of methyl iodide in 100 ml. of absolute ether were added to 550 mg. of lithium chips in 200 ml. of absolute ether. After brief heating, the mixture was cooled to 0° C. and 20 g. of trans-dichloroethylene in 50 ml. of absolute ether were added over a period of 30 minutes under nitrogen atmosphere. The cooling bath was removed and stirring was continued at room temperature for 1.5 hours. The resulting solution of lithium-chloroacetylene was mixed over a period of 30 minutes with 1.45 g. of 1-hydroxyestrone dissolved in 300 ml. of absolute toluene. The mixture was heated with stirring for 1.5 hours, and was then cooled to −60° C. It was decomposed at this temperature with a saturated aqueous solution of 2.5 g. ammonium chloride. The mixture was warmed to room temperature and extracted with ether. The ether extract was dried over sodium sulfate, and the solvent was distilled off. A residue of 1-hydroxy-17α-chloroethynylestradiol was obtained.

UV: $\epsilon_{206}=33,300$, $\epsilon_{285}=2,200$.

Example 8

13.8 g. of sodium in small pieces were added to about 300 ml. of liquid ammonia at −80° to −60° C. after addition of a trace of ferric nitrate. When the blue color had disappeared, 24.6 g. of 1,4-dichlorobutyne-(2) were added drop by drop, and thereafter 5g. of 1-hydroxyestrone dissolved in absolute tetrahydrofuran. The mixture was permitted to react with stirring at −40° C. for two hours. It was then decomposed by means of saturated aqueous ammonium chloride solution. The ammonia was evaporated by letting the mixture stand, and the product was extracted with methylene chloride. The extract was washed with water, dried over sodium sulfate, and purged of solvent. 1-hydroxy-17α-butadiynylestradiol was obtained.

UV: $\epsilon_{206}=38,300$, $\epsilon_{285}=2,200$.

Example 9

1.2 g. 1-hydroxy-17α-ethynylestradiol-17β-acetate were etherified by means of an ether solution of diazomethane as described in Example 3(a) above. 1-hydroxy-17α-ethynylestradiol-1,3-dimethyl ether-17β-acetate was obtained.

UV: $\epsilon_{205}=38,100$, $\epsilon_{284}=2,050$.

Example 10

1.8 g. 1-hydroxy-17α-chlorethinyl-estradiol were acetylated to 1-hydroxy-17α-chlorethinyl-estradiol-1,3-diacetate melting at 225° to 227° C. (from hexane/acetone) by the method described Example 1(b). UV: $\epsilon_{206}=22,600$, $\epsilon_{266}=400$.

Example 11

1 g. 1-hydroxy-17α-butadiynyl-estradiol was acetylated as described in Example 1(b) above to 1-hydroxy-17α-butadiynylestradiol-1,3-diacetate of melting point 184° C. (from hexane/acetone).

UV: $\epsilon_{206}=19,200$, $\epsilon_{253}=494$, $\epsilon_{286}=171$, $\epsilon_{305}=155$, $\epsilon_{264}=449$.

Example 12

Solutions of 1.06 g. of 1-hydroxy-17α-ethynyl-estradiol-1,3-diacetate in 70 ml. of benzene, and of 10 mg. of p-toluenesulfonic acid in 20 ml. of benzene were each evaporated to one-half of their original volume, cooled, combined, and mixed with 1 ml. dihydropyran. The mixture was stirred at room temperature for one hour, then shaken with ice cold sodium bicarbonate solution, washed with water until neutral, dried, and evaporated. The residue was recrystallized from hexane and was 1-hydroxy-17α-ethylyl-estradiol-17β-tetrahydropyranyl ether-1,3-diacetate of a melting point 134–135° C.

UV: $\epsilon_{207}=16,800$, $\epsilon_{266}=394$.

Example 13

(a) 2 g. of 1-hydroxyestrone were dissolved in 70 ml. absolute benzene. The solution was evaporated to 50 ml. 20 mg. of p-toluenesulfonic acid were dissolved in 30 ml. benzene, and the solution was evaporated to 15 ml. The concentrates were cooled and combined. 4 ml. of freshly distilled dihydropyran were added to the mixture which was then stirred at room temperature for two hours, and thereafter diluted with ether. The organic phase was washed with sodium bicarbonate solution and with water, dried, and evaporated. The residue was 1-hydroxy-estrone-1,3-ditetrahydropyranyl ether.

UV: $\epsilon_{205}=38,500$, $\epsilon_{284}=2,100$.

(b) A Grignard solution was prepared from 15 g. of magnesium chips and 45.7 ml. of ethyl bromide in 400 ml. absolute tetrahydrofuran, and acetylene was introduced for 1–2 hours. A solution of 5.5 g. of 1-hydroxyestrone-1,3-ditetrahydropyranyl ether in 100 ml. of absolute tetrahydrofuran was added drop by drop to the suspension of acetylene magnesium bromide, and the mixture was stirred for 20 hours at 70° C. under argon. The reaction mixture was cooled, then saturated aqueous ammonium chloride solution was added, the organic phase was separated, and the aqueous phase was extracted repeatedly with ether. The combined organic phases were washed with saturated sodium chloride solution and dried over sodium sulfate. When the solvent was evaporated, there was obtained 1-hydroxy-17α-ethynylestradiol-1,3-ditetrahydropyranyl ether.

UV: $\epsilon_{205}=38,500$, $\epsilon_{284}=2,100$.

(c) 11.4 g. of methyl iodide in 200 ml. of absolute ether were added drop by drop to 1.1 g. of lithium chips in 400 ml. of absolute ether. The mixture was briefly heated and then cooled to 0° C., whereupon 40 g. of trans-dichloroethylene in 100 ml. of absolute ether were added under nitrogen within 30 minutes. The cooling bath was removed, and the reaction mixture was stirred at room temperature for 1.5 hours. A solution of 4.6 g. 1-hydroxyestrone-1,3-ditetrahydropyranyl ether in 150 ml. of absolute toluene was added to the resulting solution of lithium chloroethylene within 30 minutes. The mixture was heated with stirring for 1.5 hours, and was then cooled to −60° C. It was decomposed at this temperature with a saturated aqueous solution of 5 g. of ammonium chloride, heated to room temperature, and extracted with ether. The extract was dried over sodium sulfate and evaporated to dryness. The residue was 1-hydroxy-17α-chloroethynyl-estradiol-1,3-di-tetrahydropyranyl ether.

UV: $\epsilon_{206}=38,300$, $\epsilon_{285}=2,200$.

(d) A trace of ferric nitrate and 6.9 g. of sodium in small pieces were added to about 150 ml. of liquid ammonium at −80° to −60° C. When the blue color had disappeared, 12.3 g. of 1,4-dichloro-2-butyne were added drop by drop, and thereafter 4.2 g. of 1-hydroxyestrone-1,3-di-tetrahydropyranyl ether dissolved in absolute tetrahydrofuran. The mixture was permitted to react with agitation for 2 hours at −40° C., and was then decomposed with saturated aqueous ammonium chloride solution. The ammonia was permitted to evaporate, and the product was extracted with methylene chloride. The extract was washed with water, dried over sodium sulfate and evaporated to yield 1-hydroxy-17α-butadiynyl-estradiol-1,3-di-tetrahydropyranyl ether.

UV: $\epsilon_{206}=38,300$, $\epsilon_{291}=5,300$, $\epsilon_{285}=2,040$, $\epsilon_{230}=7,800$, $\epsilon_{297}=5,370$.

Example 14

A trace of ferric nitrate and 0.134 g. of sodium in small pieces were added to about 100 ml. of liquid ammonia at −80° to −60° C. When the blue color disappeared, a solution of 2.5 g. of 1-hydroxy-17α-ethynylestradiol-1,3-di-tetrahydropyranyl ether in 50 ml. of absolute tetrahydrofuran was added drop by drop over a period of ten minutes, and the mixture was stirred for one to two hours. 1 g. of methyl iodide in 10 ml. of absolute tetrahydrofuran were then added, and stirring was continued for 3 hours, whereupon the mixture was poured over ice, neutralized with acetic acid, and extracted with methylene chloride. The organic phase was washed with water, dried over sodium sulfate, and evaporated. 1-hydroxy-17α-ethynyl-estradiol-1,3-di-tetrahydropyranyl-17β-methyl ether was obtained.

UV: $\epsilon_{205}=38,300$, $\epsilon_{285}=2,040$.

Example 15

1 g. of 1-hydroxy-17α-ethynylestradiol-1,3-di-tetrahydropyranyl ether-17β-methyl ether was refluxed 45 minutes with 1 g. of oxalic acid and 1 ml. of water in 50 ml. of methanol, and the mixture was then cooled, and added to ice water. The precipitate was filtered, washed, and dried. It was 1-hydroxy-17α-ethynylestradiol-17β-methyl ether.

UV: $\epsilon_{207}=38,500$, $\epsilon_{286}=2,160$.

Example 16

1 g. 1-hydroxy-17α-ethynylestradiol-17β-methyl ether was dissolved in 5 ml. of pyridine and 5 ml. of acetic anhydride with cooling. The reaction mixture was kept at room temperature for 15 hours, and was then poured into a tenfold amount of ice water. The precipitate formed was filtered with suction, washed with water, and dried. It was 1-hydroxy-17α-ethynylestradiol-17β-methyl ether-1,3-diacetate.

UV: $\epsilon_{207}=18,800$, $\epsilon_{266}=410$.

Example 17

A solution of diazomethane in ether was added to a solution of 1.5 g. 1-hydroxy-17α-ethynylestradiol-17β-methyl ether in 150 ml. ether until the yellow color of diazomethane persisted, whereupon the solvent was distilled off in a vacuum, and 1-hydroxy-17α-ethynylestradiol-1,3,17β-trimethyl ether was obtained.

UV: $\epsilon_{205}=38,200$, $\epsilon_{285}=2,050$.

Example 18

A mixture of 3 g. of 1-hydroxy-17α-ethynylestradiol-1,3-di-tetrahydropyranyl ether, 15 ml. of pyridine, and 10 ml. of acetic anhydride was heated in a 150° C. oil bath for ten hours under nitrogen. The mixture was then cooled to room temperature, added to ice water, and stirred for one hour, whereupon the precipitate formed was filtered off, washed with water, and dried. 1-hydroxy-17α-ethynyl-estradiol-1,3-di-tetrahydropyranyl ether-17β-acetate was obtained.

UV: $\epsilon_{205}=38,400$, $\epsilon_{284}=2,100$.

Example 19

1.5 g. 1-hydroxy-17α-ethynylestradiol-1,3-di-tetrahydropyranyl ether-17β-acetate were hydrolyzed as described in Example 15 to 1-hydroxy-17α-ethynylestradiol-17β-acetate.

UV: $\epsilon_{207}=38,500$, $\epsilon_{286}=2,150$.

Example 20

2 g. 1-hydroxy-17α-ethynylestradiol-17β-acetate were acetylated as described in Example 16 above, to the 1-hydroxy-17α-ethynylestradiol-1,3,17β-triacetate.

UV: $\epsilon_{207}=18,700$, $\epsilon_{266}=420$.

Example 21

1.5 g. of 1-hydroxy-17α-ethynylestradiol-1,3-di-tetrahydropyranyl ether were hydrolyzed as described in Example 15 above to prepare 1-hydroxy-17α-ethynylestradiol. When recrystallized from ethyl acetate and hexane, the compound melts at 189–191° C.

UV: $\epsilon_{207}=38,400$, $\epsilon_{286}=2,160$.

Example 22

A Grignard solution was prepared from 3.65 g. of magnesium chips, 16.3 g. of ethyl bromide, 150 ml. absolute tetrahydrofuran, and a solution of 8 g. propyne in 60 ml. absolute tetrahydrofuran was added drop by drop while the temperature was kept at −60° C. When gas development stopped, a solution of 6.8 g. of 1-hydroxyestrone-1,3-di-tetrahydropyranyl ether in 100 ml. of absolute tetrahydrofuran was added, and the mixture was heated under nitrogen and under anhydrous conditions for 20 hours to 70° C. The reaction product was worked up as described in Example 13(b), and 1-hydroxy-17α-propynyl-estradiol-1,3-di-tetrahydropyranyl ether was obtained.

UV: $\epsilon_{204}=38,300$, $\epsilon_{285}=2,105$.

We claim:
1. A compound of the formula

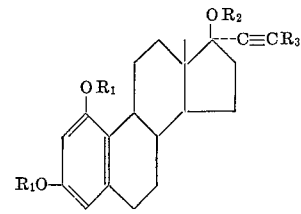

wherein $R_1$ and $R_2$ are members of the group consisting of hydrogen, lower alkyl, tetrahydropyranyl, and the acyl radical of a physiologically tolerated carboxylic acid and physiologically tolerated acid radicals and $R_3$ is hydrogen, chlorine, lower alkyl or lower alkynyl.

2. A compound as set forth in claim 1, which is: 1-hydroxy-17α-ethynyl-estradiol.

3. A compound as set forth in claim 1, which is: 1-hydroxy-17α-ethynyl-estradiol-1,3-diacetate.

4. A compound as set forth in claim 1, which is: 1-hydroxy-17α-ethynyl-estradiol-triacetate.

5. A compound as set forth in claim 1, which is: 1-hydroxy-17α-ethylnyl-estradiol-1,3-dimethyl ether.

6. A compound as set forth in claim 1, which is: 1-hydroxy-17α-ethylnyl-estradiol-1,3-dimethyl ether-17β-acetate.

7. A compound as set forth in claim 1, which is: 1-hydroxy-17α-ethynyl-estradiol-trimethyl ether.

8. A compound as set forth in claim 1, which is: 1-hydroxy-17α-ethynyl-estradiol-17β-acetate.

9. A compound as set forth in claim 1, which is: 1-hydroxy-17α-chloroethynyl-estradiol.

10. A compound as set forth in claim 1, which is: 1-hydroxy-17α-butadiynyl-estradiol.

11. A compound as set forth in claim 1, which is: 1-hydroxy-17α-chloroethynyl-estradiol-1,3-diacetate.

12. A compound as set forth in claim 1, which is: 1-hydroxy-17α-butadiynyl-estradiol-1,3-diacetate.

13. A compound as set forth in claim 1, which is: 1-hydroxy - 17α - ethynyl-estradiol-17β-tetrahydropyranyl ether-1,3-diacetate.

14. A compound as set forth in claim 1, which is: 1-hydroxy-17α - ethynyl-estradiol-1,3-di-tetrahydropyranyl ether.

15. A compound as set forth in claim 1, which is: 1-hydroxy - 17α - chloroethynyl-estradiol-1,3-di-tetrahydropyranyl ether.

16. A compound as set forth in claim 1, which is: 1-hydroxy - 17α-butadiynyl-estradiol-1,3-di-tetrahydropyranyl ether.

17. A compound as set forth in claim 1, which is: 1-hydroxy-17α-ethynyl-estradiol - 1,3-di-tetrahydropyranyl-17β-methyl ether.

18. A compound as set forth in claim 1, which is: 1-hydroxy-17α-ethynyl-estradiol-17β-methyl ether.

19. A compound as set forth in claim 1, which is: 1-hydroxy-17α-ethynyl-estradiol-17β-methyl ether - 1,3-diacetate.

20. A compound as set forth in claim 1, which is: 1- hydroxy-17α-ethynyl - estradiol-1,3-di-tetrahydropyranyl ether-17β-acetate.

21. A compound as set forth in claim 1, which is: 1-hydroxy-17α-propynyl-estradiol-1,3-di - tetrahydropyranyl ether.

22. A medicinal composition having estrogenic and anti-ovulatory activity essentially consisting of a carrier and an active agent which is a derivative of 1-hydroxy-estradiol as set forth in claim 1.

23. A composition as set forth in claim 22 which is a tablet for oral administration.

24. A composition as set forth in claim 22, wherein said carrier is an oil which contains the active agent in solution for intramuscular injection.

References Cited

UNITED STATES PATENTS 3,291,814  12/1966  Marshall _____ 260—397.4

OTHER REFERENCES

Hecker: "Chem. Berichte," vol. 97, (1964) pp. 1940–1951 relied on.

ELBERT L. ROBERTS, *Primary Examiner.*

U.S. Cl. X.R.

260—239.55, 397.5; 424—241